US006242878B1

(12) United States Patent
Wilson

(10) Patent No.: US 6,242,878 B1
(45) Date of Patent: Jun. 5, 2001

(54) ELECTRONIC CONTROL APPARATUS

(75) Inventor: Edward Wilson, Warton (GB)

(73) Assignee: BAE Systems plc, Farnborough (GB)

( * ) Notice: Subject to any disclaimer, the term of this patent is extended or adjusted under 35 U.S.C. 154(b) by 0 days.

(21) Appl. No.: 09/048,837

(22) Filed: Mar. 27, 1998

(30) Foreign Application Priority Data

Mar. 27, 1997 (GB) .................................................. 9706447

(51) Int. Cl.⁷ .............................. B64D 31/02; G05G 5/03
(52) U.S. Cl. ......................... 318/566; 318/625; 318/626
(58) Field of Search .................................. 318/565, 566, 318/625, 626, 646, 663, 676, 40, 159, 436

(56) References Cited

U.S. PATENT DOCUMENTS

| 2,505,555 | * | 4/1950 | Levy . | |
|---|---|---|---|---|
| 2,754,465 | * | 7/1956 | Brier . | |
| 3,270,260 | * | 8/1966 | Mehr . | |
| 3,369,161 | * | 2/1968 | Kaufman . | |
| 3,854,080 | * | 12/1974 | Bambara et al. | 318/436 |
| 4,150,803 | * | 4/1979 | Fernandez . | |
| 5,347,203 | * | 9/1994 | Swinson | 318/268 |
| 5,347,204 |  | 9/1994 | Gregory et al. . | |
| 5,559,415 |  | 9/1996 | Gregory et al. . | |
| 5,656,901 | * | 8/1997 | Kurita | 318/436 |

FOREIGN PATENT DOCUMENTS

| 0 326 439 | 8/1989 | (EP) . |
|---|---|---|
| 0 483 773 | 5/1992 | (EP) . |
| 0 659 639 | 6/1995 | (EP) . |
| 2 708 112 | 1/1995 | (FR) . |

OTHER PUBLICATIONS

J. Hegg et al, "Sidestick Controllers for Advanced Aircraft Cockpits" Scientific Honeyweller, Jan. 1993, pp. 70–77.

\* cited by examiner

*Primary Examiner*—Bentsu Ro
(74) *Attorney, Agent, or Firm*—Nixon & Vanderhye P.C.

(57) ABSTRACT

An electronic control apparatus comprising:
  a movable control member;
  a positional servo loop means including at least one motor means and being operable to maintain the position of said control member at any one of a plurality of positions in the range of movement thereof in accordance with a demand signal;
  force detection means for detecting a force applied to said control member and for providing to said servo loop means a demand signal which varies in accordance with the magnitude of said applied force.

18 Claims, 6 Drawing Sheets

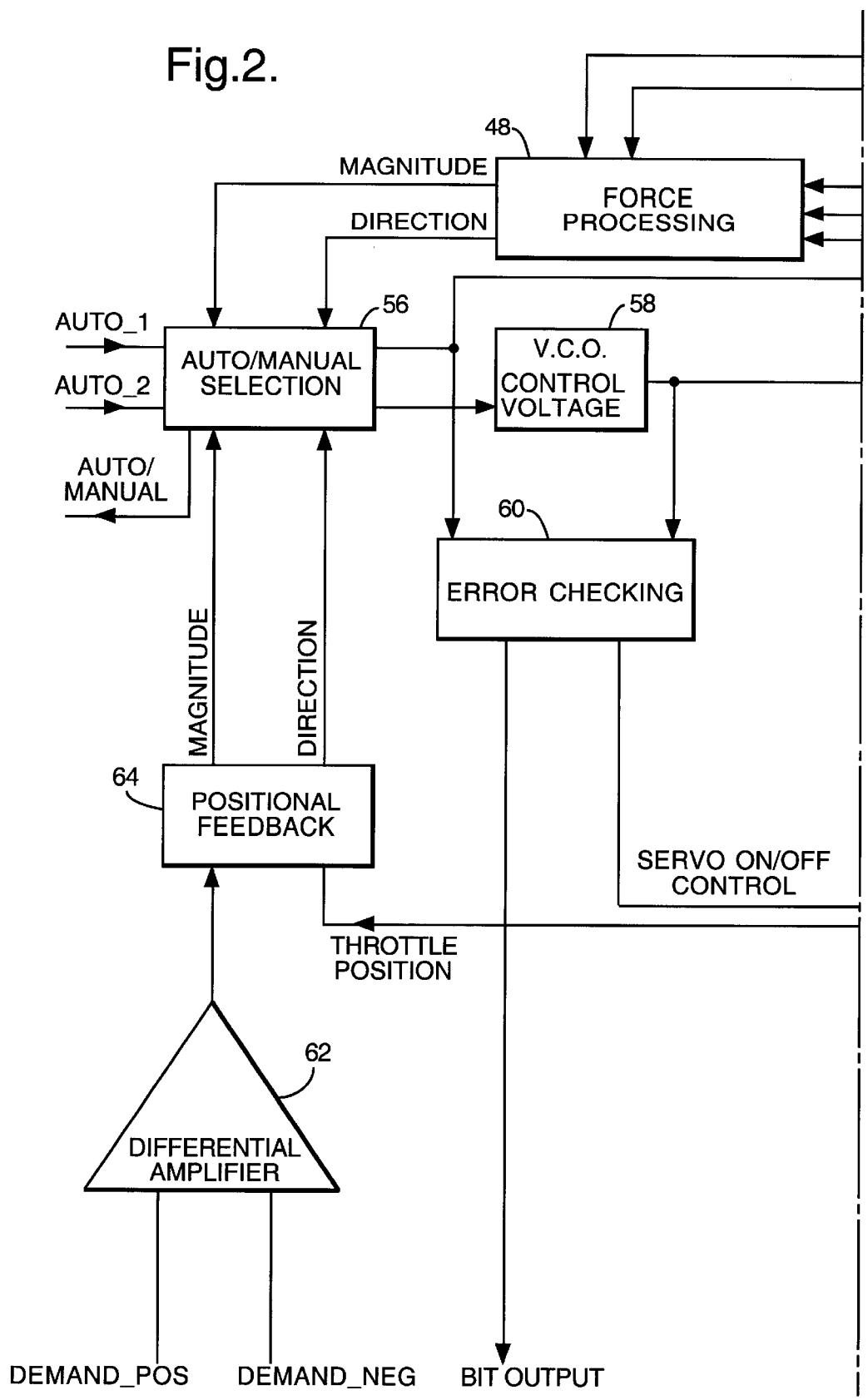

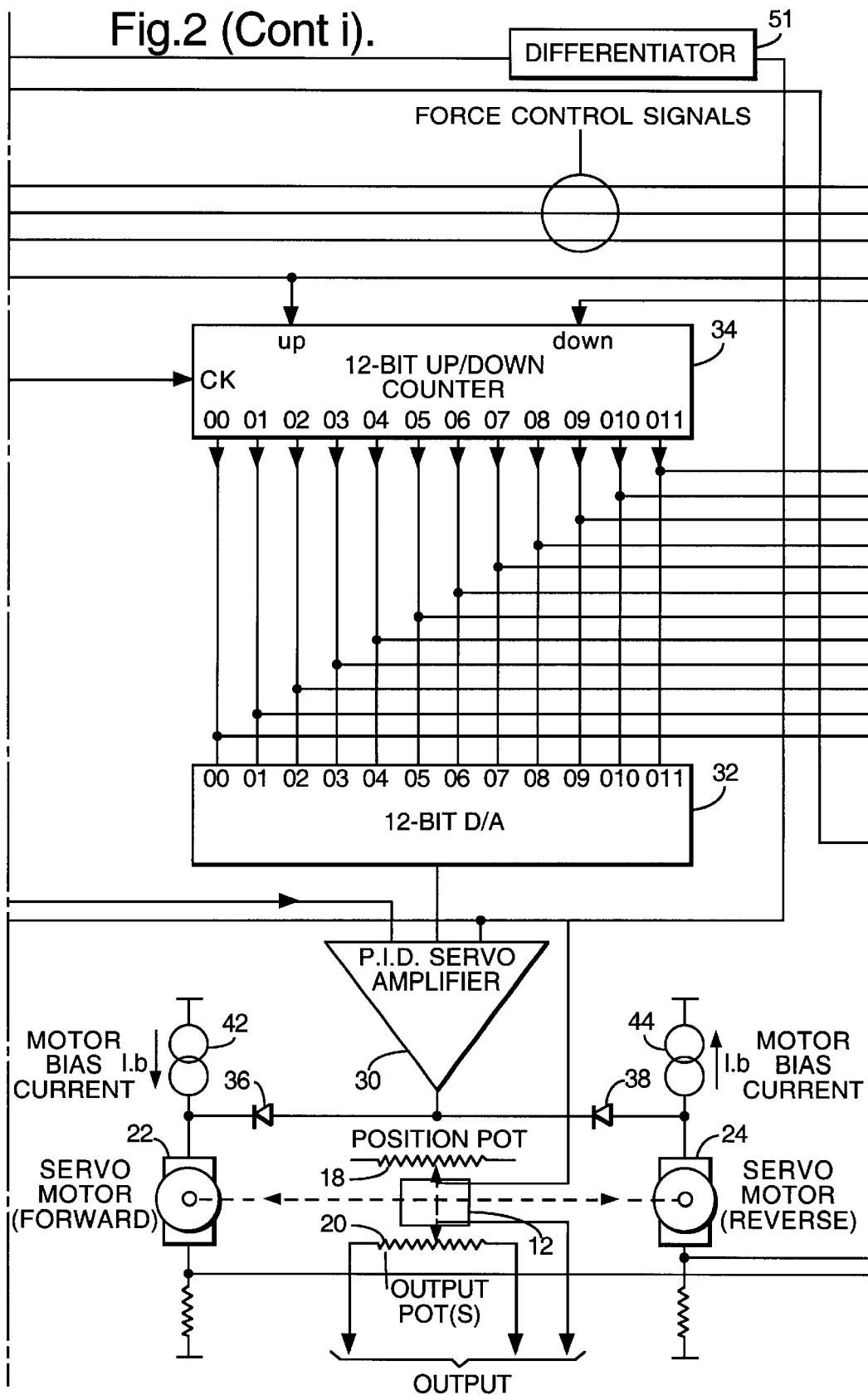
Fig.2 (Cont i).

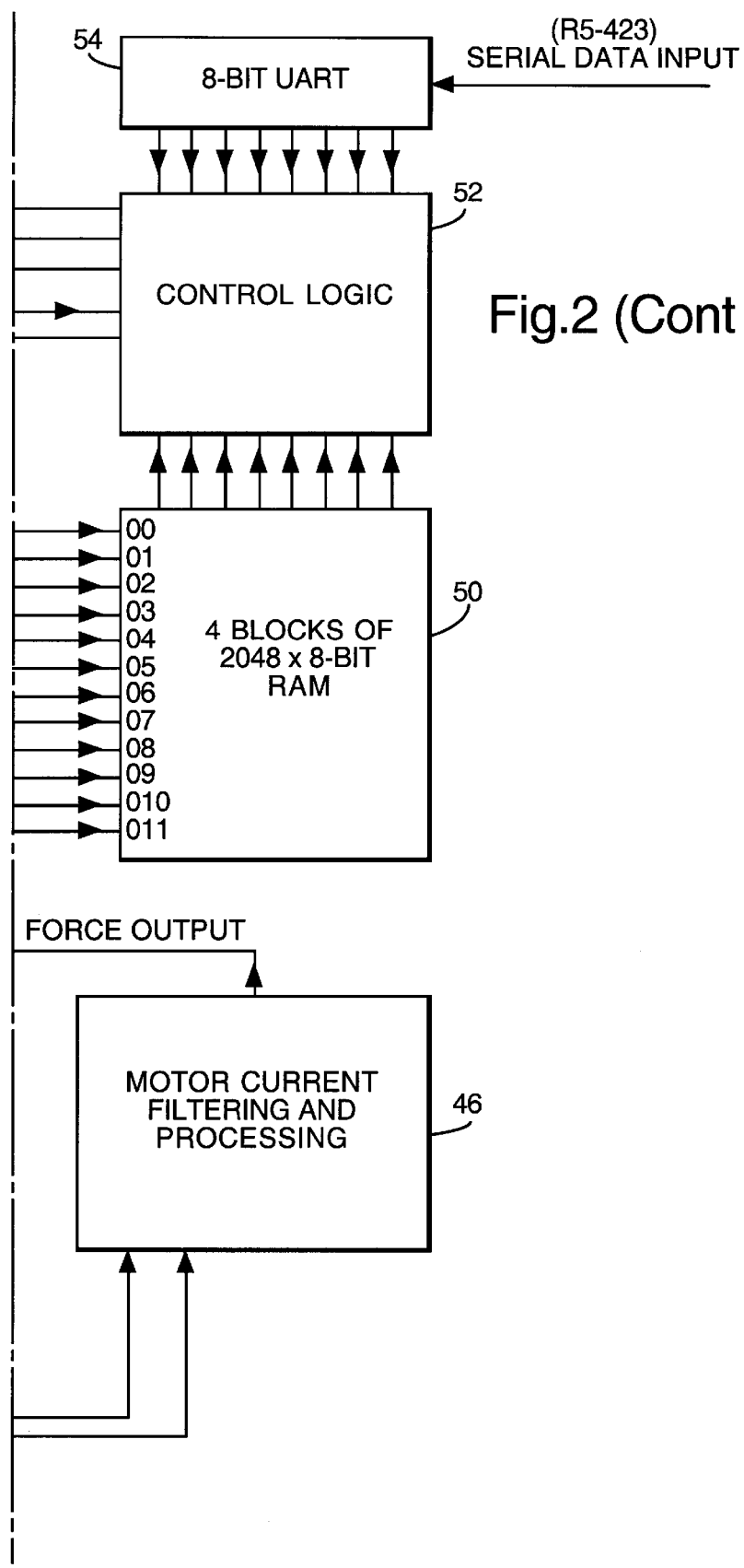
Fig.2 (Cont ii).

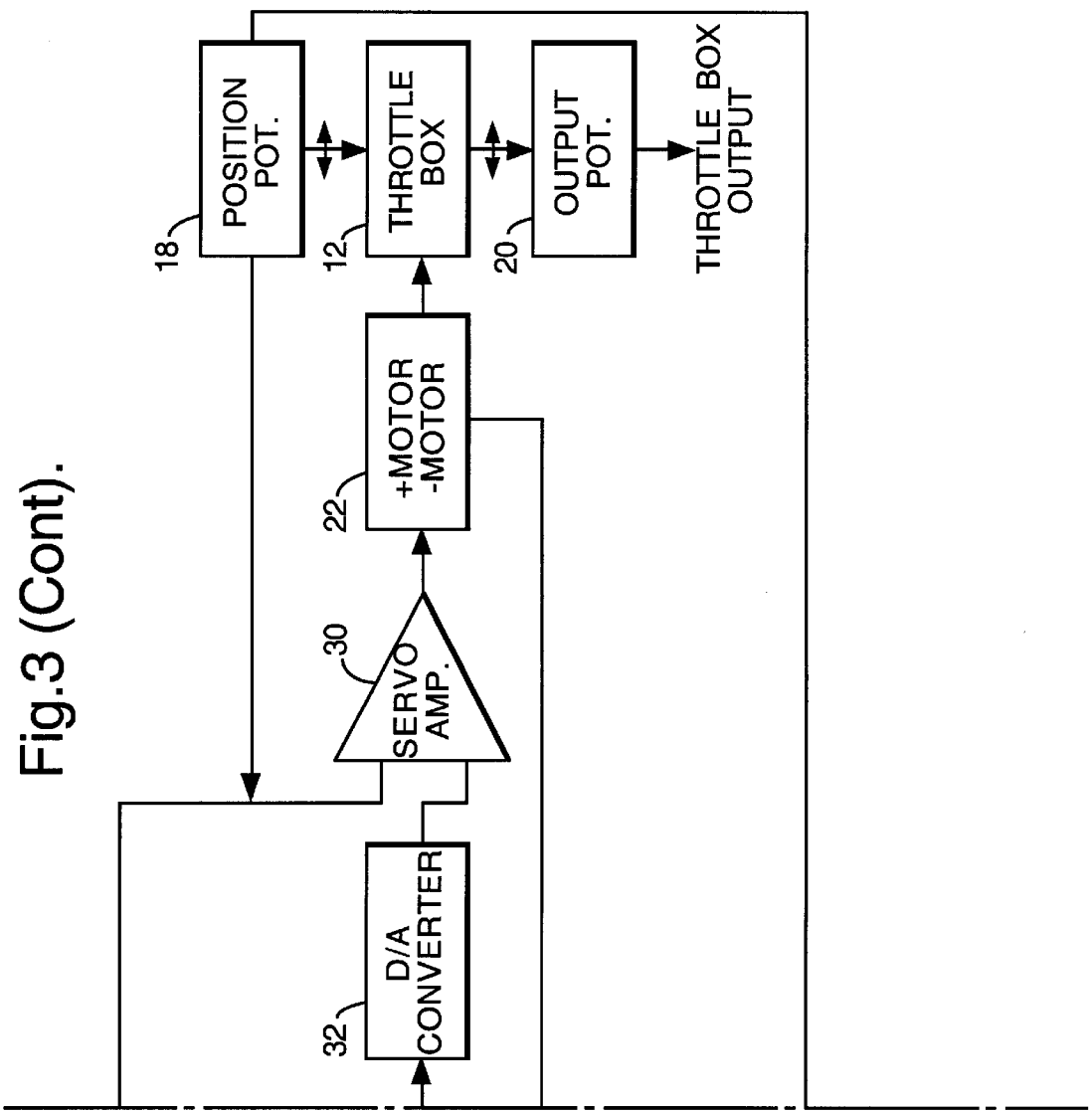

ELECTRONIC CONTROL APPARATUS

BACKGROUND OF THE INVENTION

1. Field of the Invention

This invention relates to electronic control apparatus and in particular, but not exclusively, to an electronic throttle box for controlling an engine of an aircraft. The invention does however extend more widely to any electronic control apparatus in which a moveable control member exerts a control function either directly or indirectly.

2. Discussion of Prior Art

In an aircraft, the throttle box is a sophisticated item of equipment, allowing the pilot manually to control the aircraft thrust whilst giving him tactile feedback to indicate various conditions or operating regimes of the engine. In addition the throttle box should be designed so that the control member or "throttle top" is not moved inadvertently by vibration or acceleration experienced by the aircraft in use.

Thus the requirements imposed on a throttle box for it to be suitable for use in a modern fighter aircraft result in extremely complex mechanical designs which are expensive and difficult to produce, requiring as they do the services of skilled and highly trained personnel for their assembly and set up; for example the throttle box for use on a typical modern fighter aircraft might easily require a development outlay of around fifty thousand man hours. This complexity derives primarily from the requirement for tactile feedback implement base friction throughout the travel of the throttle top and mechanical detents to provide demarcation between distinct areas of operation such as dry and re-heat, whilst contending with the rigours of a cockpit environment—notably vibration.

SUMMARY OF THE INVENTION

According to one aspect of this invention there is provided an electronic control apparatus comprising:

a movable control member;

a positional servo loop means including at least one motor means and being operable to maintain the position of said control member at any one of a plurality of positions in the range of movement thereof in accordance with a demand signal;

force detection means for detecting a force applied to said control member and for providing to said servo loop means a demand signal which varies in accordance with at least one of the magnitude and direction of said applied force when it exceeds a preset threshold (which may be zero).

By this arrangement the force applied to the control member is detected and used to cause the positional servo loop means to move the control member in the appropriate direction. At rest, the position of the control member is maintained by the positional servo loop means (unless the applied force or torque exceeds the maximum force or torque available to the servo loop).

Preferably, the apparatus includes base friction threshold means for thresholding said force detection means whereby an applied force below a preset threshold does not cause said loop means to alter the position of the control member, thereby providing a base friction effect over at least part of the range of movement of said movable member. The threshold applied may of course be varied to adjust the base friction level or "stiffness" and this may be set at different levels at different parts of the range of movement of the movable control member.

The apparatus preferably also includes detent friction threshold means for locally thresholding said force detection means at one or more predetermined locations within the range of movement of said movable member, whereby an applied force above said localised threshold is required to alter the position of said movable control member, thereby to provide a detent effect.

The servo loop means may advantageously comprise two motor means operable in a normal mode selectively to move the movable member in respective opposed directions. Preferably said motor means are additionally operable in a fall-back mode to allow a selected one thereof to be actuable to move the movable member in either of said opposed directions.

The apparatus preferably includes electric bias means operable in said normal mode to supply a bias drive signal to each of said motors to bias the drive thereof in opposite directions, thereby to reduce or minimize backlash.

The force detection means may take various forms such as a force transducer but it is particularly preferred to monitor the drive signal to the, or at least one of the, motor means, thereby to determine the force transmitted by said movable member to said motor means.

Particularly where the electronic control apparatus is in an environment subject to high acceleration, it is preferred for said force detection means to include means for distinguishing between an acceleration-induced force and a control force manually or externally applied to said movable member, and for adjusting said demand signal in accordance with said manually or externally applied force. Thus, for example, an accelerometer means may be attached to a static part of the structure to detect the acceleration imparted thereto, thereby to determine the acceleration-induced force experienced by the unit as a whole, which can then be used to compensate the total force signal determined by said force detection means, to obtain a net force signal representing the manually or externally applied force.

The force detection means preferably includes counter means for being incremented or decremented in accordance with the force applied to said control member, the value held on said counter means being used to generate said demand signal.

The force detection means typically comprises pulse generating means such as an oscillator means for incrementing or decrementing said counter means. The pulse frequency of said pulse generating means is preferably variable in accordance with the rate of movement applied to said control member.

The electronic control apparatus is preferably operable either manually or automatically. In the case of automatic operation an auto-control signal may be externally generated in accordance with one or more parameters of the object or system being controlled and which identify a required position for said movable member. In this instance the apparatus preferably also includes automatic control means responsive to a positional signal representative of the position of said movable member and said externally generated auto-control signal to provide a demand signal for said positional servo loop means. Thus, in use, the movable control member is caused to move to or maintain the current position indicated by said auto-control signal.

Although the movable member itself may directly exert control, for example it may be secured to or linked to a valve member, in its preferred applications a position transducer, such as for example a potentiometer or position encoder, detects the position of said movable member and provides an output signal in accordance therewith.

In another aspect of this invention, there is provided an aircraft incorporating an electronic control apparatus as described above.

In yet another aspect, there is provided a method of controlling the relative position of a movable control member which comprises the steps of:

providing a positional servo loop means including at least one motor means to maintain the position of said control member at any one of a plurality of positions in the range of movement thereof;

detecting the force applied to said control member in use thereby to provide a demand signal, and applying said demand signal as an input to said positional servo loop means.

Whilst the invention has been described above it extends to any inventive combination of the features set out above or in the following description.

BRIEF DESCRIPTION OF THE DRAWINGS

The invention may be performed in various ways and an embodiment thereof will now be described by way of example only, reference being made to the accompanying drawings, in which:

FIG. 2 is a schematic block diagram of the apparatus of FIG. 1, and

DETAILED DISCUSSION OF PREFERRED EMBODIMENTS

The control apparatus illustrated in the Figures is an embodiment of an electronic throttle box for use in controlling the thrust of an engine in an aircraft. The throttle box is designed to be operable either manually or under automatic control where the position of the throttle control is moved automatically in accordance with the signals produced by a computer on board the aircraft.

Figure 1:
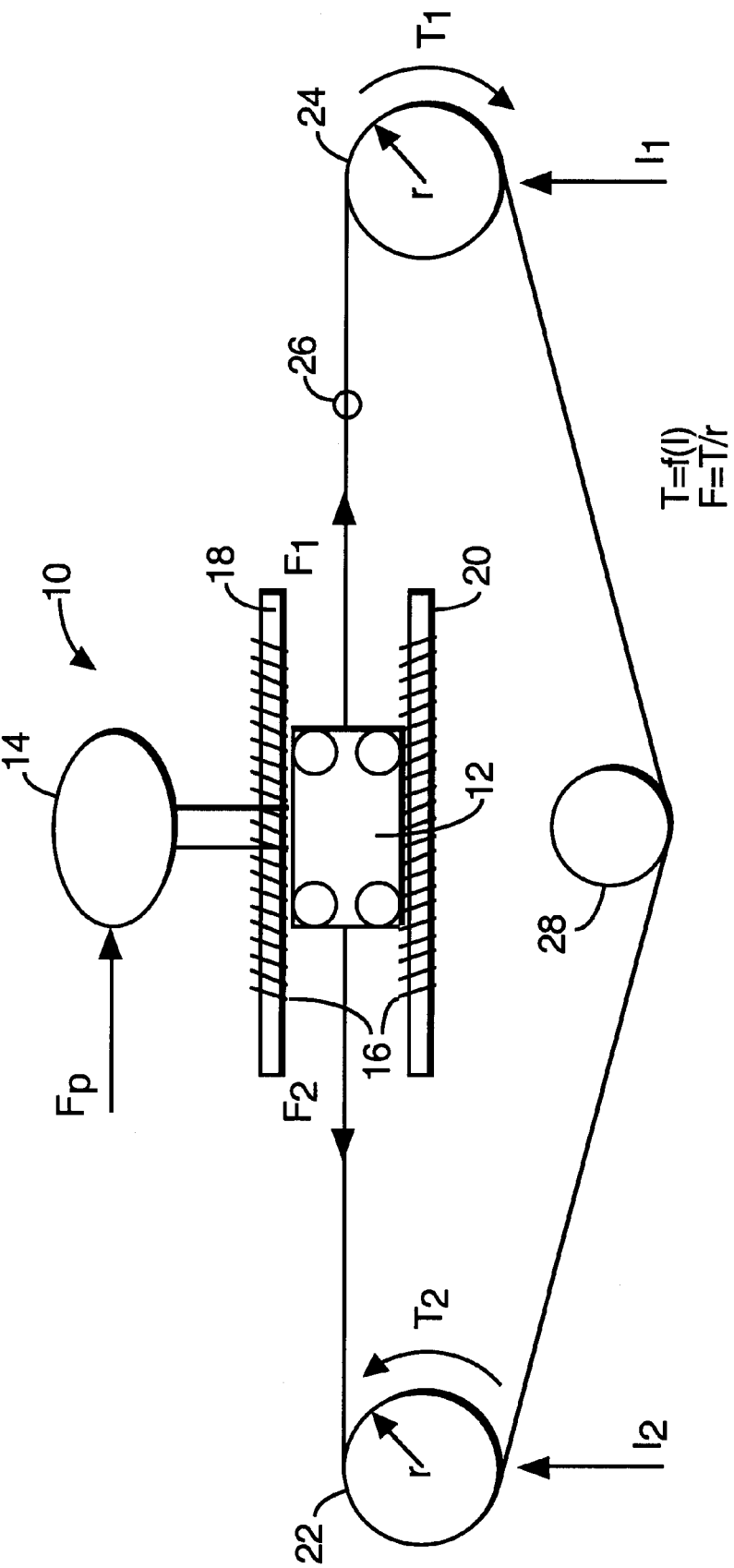
FIG. 1 is a schematic diagram of a control apparatus of this invention, showing the various forces and torques acting.

Referring initially to FIG. 1, the throttle box 10 comprises a movable member or throttle top 12 having an exposed manually grippable portion 14 and being constrained by guides 16 to move longitudinally. The position of the throttle top 12 is detected by a position potentiometer 18, whose output is used in a servo loop as to be described below, and by an output potentiometer 20 whose output constitutes the output of the throttle box. In this embodiment, manually-initiated movement of the throttle top 12 is controlled by a forward servo motor 22 and a reverse servo motor 24 by means of a drive belt or drive chain 26 which is tensioned by means of the two motors, with excess play removed by a pulley 28. As to be discussed below, the forward and reverse servo motors are also used to drive the throttle top 14 when the throttle box is in an automatic mode receiving signals from the flight computer.

Figure 3:
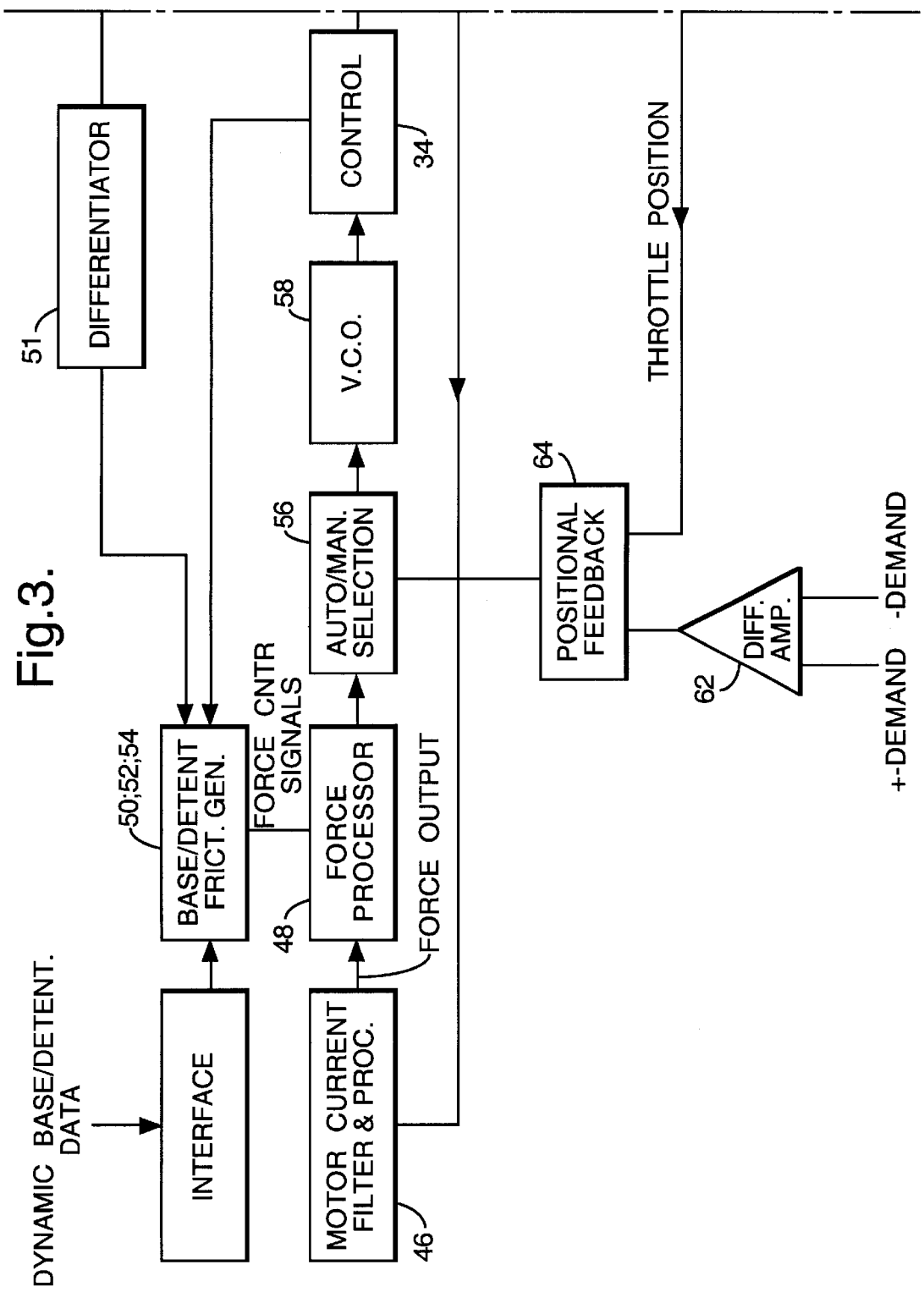
FIG. 3 is a more detailed block diagram of the control apparatus.

When the throttle top 12 is an in equilibrium position, the motors 22 and 24 are provided with bias currents of opposite sense to cause the motors to apply equal and opposite forces to the throttle top 12 through the drive belt or drive chain 26. Referring now to FIGS. 2 and 3, each of the forward and reverse servo motors 22 and 24 is controlled by a servo loop which comprises the positioned potentiometer 18 and a proportional-integral-differential (PID) servo amplifier 30. The PID servo amplifier 30 receives one input from the position potentiometer 18 and another input (representing the position demand signal) from a 12-bit digital to analogue converter 32 which receives the output of a 12-bit up/down counter 34. The output of the digital to analogue converter 32 is an analogue level, proportional to the value of the count on the counter 34, which is used as the demand input to the positional servos.

The output of the PID servo amplifier 30 passes to the forward servo motor 22 and the reverse servo motor 24 through respective forwardly and reversely biased diodes 36 and 38 (see FIG. 2) so that the output signal from the amplifier is supplied to only one of the motors at a time, dependent on the sign of the amplifier output.

Current generators 42 and 44 respectively provide the motor bias currents needed to bias the motors in opposite directions. The output of the counter 34 therefore acts as a memory for the throttle position and, whilst the value of the counter remains unchanged, the demanded position will remain static and the positional servo will do all in its power to hold the throttle top at this fixed position.

The currents of the forward and reverse servo motors 22 and 24 are detected by a motor current filtering and processing circuit 46 which uses the motor currents to determine the torques acting on the motors and thus deduces the magnitude and direction of any force applied to the throttle top via the handle 14. Whilst not shown, the apparatus may also include an accelerometer attached to a static part of the apparatus, to deduce the acceleration-induced force experienced by the throttle top 12 and to compensate for this so that the force output signal from the processing unit 46 indicates the net manually or externally applied force. The force output signal is supplied to a force processing circuit 48 which also receives from the control logic 52 force control signals which effectively define a position-dependent force threshold below which the net applied force should be ignored. The threshold will typically vary from a base friction level throughout most of the range of movement of the throttle top 12 to one or more peaks of selected height to provide the equivalent of mechanical detents to give tactile feedback to the operator. In this embodiment this is achieved by providing a look-up table 50 which defines the force threshold (i.e. friction level) levels throughout the range of movement of the throttle top. In addition, the output of the position potentiometer 18 is taken to a differentiator 51, the output of which is proportional to the velocity of the throttle top and is taken to the base/detent friction generation circuitry 48, 50, 52, 54, to provide velocity damping which increased the forces generated when high rates of throttle top movement are applied. This is of particular significance in the region of a detent because it allows the detent force to be increased such that the opposition of the detent to movement remains significant during "slams" by the pilot; mechanical embodiments suffer from the shortcoming that detents virtually disappear at high rates of travel.

This data is processed by the control logic circuit 52 which supplies the relevant force control signals to the force processing circuit 48. A serial data interface 54 is provided so that the force threshold profile may be altered dynamically to adjust the base level friction and the level of the detents. The force processing circuit 48 thus determines whether the force output from the motor current filtering and processing circuit 46 should be ignored and, if not, the magnitude and direction of the movement required. These signals are supplied to an auto/manual selection circuit 56 which allows the user to switch between automatic and manual modes. If in "Manual" mode, the magnitude and direction signals are respectively supplied to the control voltage input of a voltage controlled oscillator 58 and to the up/down port of the counter 34, thus controlling the rate and direction of counting. A count on 34 increments or decrements accordingly and this adjusts the level of the analogue signal input to the PID servo amplifier 30. An error-checking circuit 60 monitors the clock and u/d inputs to the counter 34 and switches the servo amplifier 30 off if an error is detected.

When the auto/manual selection is switched to "Auto" the positive and negative demands from this flight computer are combined at a differential amplifier 62 and the output combined at a positional feedback circuit 64 with a signal from the position potentiometer 18 indicating the current throttle position. The circuit 64 generates correctional magnitude and direction signals which are supplied via the auto/manual selection circuit 56 to the voltage controlled oscillator 58 and the counter 34 in a similar manner to manual operation.

The electronic dynamically variable threshold scheme allows both base-friction and detents to be set and adjusted, thus obviating the need for a brake mechanism and mechanical detents. Since the servo at all times holds the throttle top in the position corresponding to the counter output, there is no need for the complicated mass balance systems found in earlier arrangements to prevent the throttle lever moving under vibration. This greatly enhanced ability may be improved even further by the provision of the accelerator compensation scheme referred to above.

Monitoring the motor current to determine the force applied obviates the need for a specialised, expensive and potentially vulnerable load cell.

The arrangement makes use of two motors biassed by the bias currents to provide a quiescent torque so that backlash is removed from the system and each motor is used to drive in one direction only by means of the diode arrangements 36, 38. The control logic may also implement a fall-back mode whereby, in the event of a motor/drive failure, the faulty device can be switched out and the remaining motor/ driver used to provide drive in both directions, albeit with reduced performance in terms of system backlash.

What is claimed is:

1. An electronic control apparatus comprising:
   a movable control member;
   a positional servo loop comprising at least one motor means for resisting movement of said control member, thereby maintaining position of said control member at any one of a plurality of positions in a range of movement thereof in accordance with a demand signal;
   force detection means for detecting a force applied to said control member and for providing to said servo loop said demand signal which varies in accordance with the magnitude of said applied force.

2. An electronic control apparatus according to claim 1, which includes base friction threshold means for thresholding said force detection means whereby an applied force below a preset threshold does not cause said servo loop to alter the position of said control member, thereby providing a base friction effect over at least part of the range of movement of said movable control member.

3. An electronic control apparatus according to claim 1, including detent friction threshold means for locally thresholding said force detection means at one or more predetermined locations within the range of movement of said movable member, whereby an applied force above said localised threshold is required to alter the position of said control member, thereby to provide a detent effect.

4. An electronic control apparatus according to claim 1 wherein said servo loop comprises two motor means operable in a normal mode selectively to move the movable member in respective opposed directions.

5. An electronic control apparatus according to claim 4, wherein said motor means are additionally operably in a fall-back mode to allow a selected one thereof to be actuable to move the movable member in either of said opposed directions.

6. An electronic control apparatus according to claim 4, including electric bias means operable in said normal mode to supply a bias drive signal to each of said motors to bias the drive thereof in opposite directions, thereby to reduce or minimize backlash.

7. An electronic control apparatus according to claim 1, wherein said force detection means comprises means for monitoring the drive signal to the, or at least one of the, motor means, thereby to determine the force transmitted by said movable member to said motor means.

8. An electronic control apparatus according to claim 1, further including automatic control means responsive to a positional signal representative of the position of said movable member, and an externally-generated auto-control signal indicating a required position for said movable member thereby to provide a demand signal for said positional servo loop, whereby in use said movable control member is caused to move to or maintain said required position.

9. An electronic control apparatus according to claim 1, including position sensing or encoding means for providing an output signal determined by the position of said movable member.

10. An electronic control apparatus according to claim 1, including means for allowing dynamic reprogramming of at least one of the base friction, detent, and velocity damping characteristics of said moveable member.

11. An aircraft incorporating an electronic control apparatus as claimed in claim 1.

12. An electronic control apparatus comprising:
    a movable control member;
    a positional servo loop comprising at least one motor resisting movement of said member, thereby maintaining position of said control member at any one of a plurality of positions in a range of movement thereof in accordance with a demand signal;
    a force detector for detecting a force applied to said control member and for providing to said servo loop said demand signal which varies in accordance with the magnitude of said applied force.

13. An electronic control apparatus, comprising:
    a movable control member;
    a positional servo loop comprising at least one motor means for resisting movement of said control member, thereby maintaining position of said control member at any one of a plurality of positions in a range of movement thereof in accordance with a demand signal;
    force detection means for detecting a force applied to said control member and for providing to said servo loop said demand signal which varies in accordance with the magnitude of said applied force,
    a base friction threshold means for thresholding said force detection means whereby an applied force below a preset threshold does not cause said servo loop to alter the position of said control member, thereby providing a base friction effect over at least part of the range of movement of said movable control member, including means responsive to the speed of movement of said movable control member to adjust said threshold level or levels in accordance therewith, thereby to provide a velocity damping effect.

14. An electronic control apparatus comprising:

a movable control member;

a positional servo loop comprising at least one motor means for resisting movement of said control member, thereby maintaining position of said control member at any one of a plurality of positions in a range of movement thereof in accordance with a demand signal;

force detection means for detecting a force applied to said control member and for providing to said servo loop said demand signal which varies in accordance with the magnitude of said applied force, wherein said force detection means includes means for distinguishing between an acceleration-induced force experienced by said movable member and an externally applied control force, and for adjusting said demand signal in accordance with said externally applied force.

15. An electronic control apparatus according to claim 14, wherein said distinguishing means comprises an accelerometer for detecting acceleration of said movable member or other structure in said apparatus, thereby to determine the acceleration induced force experienced by said movable member, the apparatus further including means for compensating a force signal determined by said force detection means to obtain a net force signal representing the externally applied force.

16. An electronic control apparatus comprising:

a movable control member;

a positional servo loop comprising at least one motor means for resisting movement of said control member, thereby maintaining position of said control member at any one of a plurality of positions in a range of movement thereof in accordance with a demand signal;

force detection means for detecting a force applied to said control member and for providing to said servo loop said demand signal which varies in accordance with the magnitude of said applied force, wherein said force detection means includes counter means for being incremented or decremented in accordance with the force applied to said control member, the value held on said counter means being used to generate said demand signal.

17. An electronic control apparatus according to claim 16, wherein said force detection means comprise oscillator means for incrementing or decrementing said counter means.

18. An electronic control apparatus comprising:

a movable control member;

a positional servo loop comprising at least one motor means for resisting movement of said control member, thereby maintaining position of said control member at any one of a plurality of positions in a range of movement thereof in accordance with a demand signal;

force detection means for detecting a force applied to said control member and for providing to said servo loop said demand signal which varies in accordance with the magnitude of said applied force;

detent friction threshold means for locally thresholding said force detection means at at least one predetermined location within the range of movement of said movable member, whereby an applied force above said localized threshold is required to alter the position of said control member, thereby providing a detent effect; and means responsive to the speed of movement of said movable control member to adjust said threshold level or levels in accordance therewith, thereby to provide a velocity damping effect.

\* \* \* \* \*